Nov. 12, 1946.    F. KAHN    2,411,041
RELATIVE HUMIDITY METER
Filed Aug. 7, 1942    2 Sheets-Sheet 2
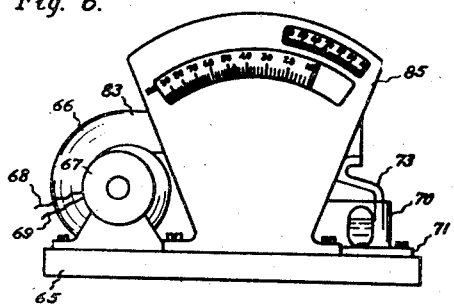
INVENTOR
*Frank Kahn*

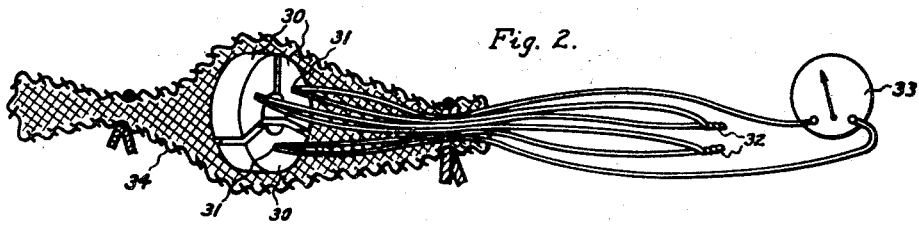
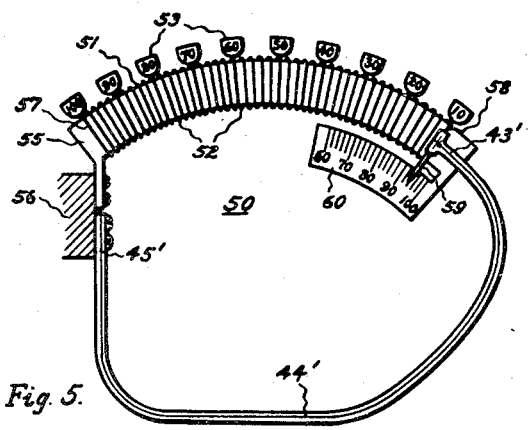
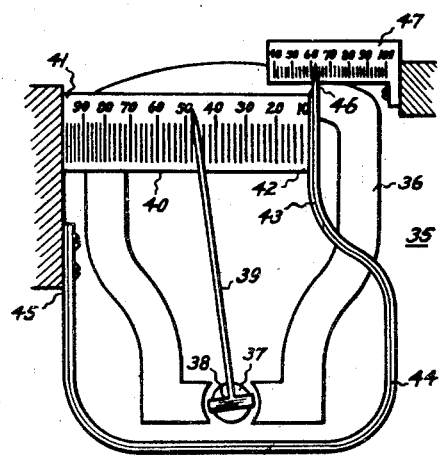
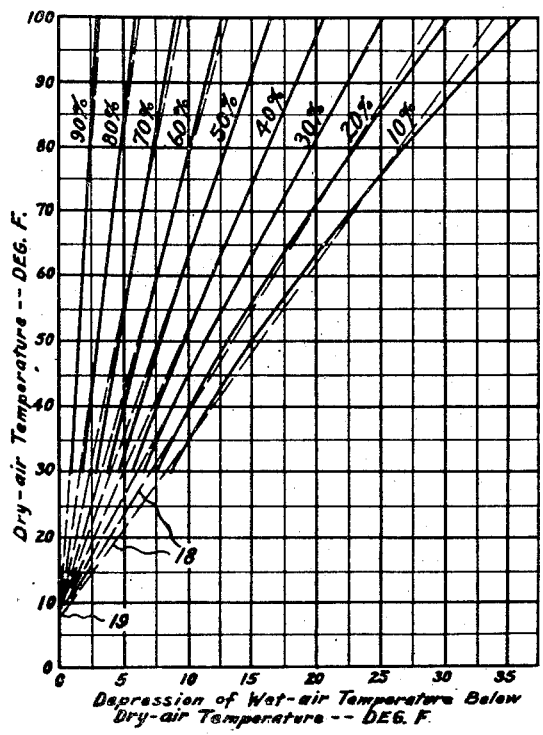
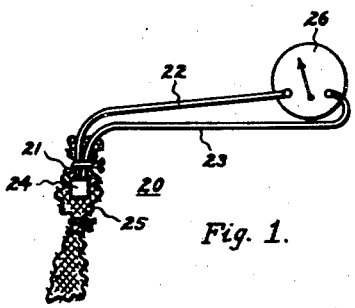

Patented Nov. 12, 1946

2,411,041

UNITED STATES PATENT OFFICE 2,411,041

RELATIVE HUMIDITY METER

Frank Kahn, Philadelphia, Pa.

Application August 7, 1942, Serial No. 454,009

12 Claims. (Cl. 73—338)

The present invention is a continuation-in-part of my patent application, Serial No. 229,281, filed September 10, 1938, now Patent No. 2,293,064, dated August 18, 1942, relating to relative humidity meters.

The invention relates to hygrometry, and, more particularly, relates to a direct reading relative humidity meter.

The most convenient and most generally employed method for measuring the degree of saturation of the atmosphere with moisture is to observe the temperature of evaporation, that is, the difference between the dry-air and wet-air temperatures. The dry-air or ambient temperature is read with the ordinary thermometer. The wet-air temperature may be accurately observed with the sling or whirled psychrometer, with the wet-air thermocouple described in Patent No. 2,128,462, dated August 30, 1938, issued jointly to Edward R. Wayne and myself, and relating to thermocouple hygrometers, and with my bimetal wet-air temperature responsive unit hereinafter described in detail. With the difference between the dry-air and wet-air temperatures determined, the relative humidity may be obtained from the Weather Bureau Psychrometric Tables, or the equivalent standard formula or chart.

This method of determining relative humidity, although of high accuracy, is inconvenient and because it is not direct reading is unsuited for recording or for control of humidity conditioning apparatus. On the other hand reasonably priced direct reading devices, which have heretofore been based upon relative tension of hygroscopic materials, have been highly unreliable, and have required much too frequent calibrations and adjustments to render their use practical where any degree of accuracy is required.

The increasing importance of air conditioning emphasizes the need for a simple, compact, inexpensive and reliable device for measuring relative humidity. Apparatus for this purpose heretofore available has been extremely large and expensive, very inconvenient and laborious to operate, or highly unreliable.

The primary object of my invention is to provide a direct reading relative humidity meter in which these defects are remedied.

An object of my invention is to produce a direct reading relative humidity meter of high accuracy.

Another object of my invention is to provide a reliable direct reading relative humidity recorder.

A further object of my invention is to produce an inexpensive, simple, durable and reliable direct reading relative humidity indicator of good accuracy.

Another object of my invention is to provide an indicating instrument having an expansible scale.

Still another object of my invention is to provide a bimetal wet-air temperature responsive unit.

Still a further object of my invention is to provide an automatic direct-reading relative humidity meter which is accurate, occupies a minimum of space, requires very little water, and needs practically no attention or servicing.

With these and other objects in view, which will become apparent as the description proceeds, my invention is embodied in a relative humidity observing system which consists essentially of a wet-air temperature responsive unit in a stream of the air being metered, a dry-air temperature responsive unit in the same air, a meter having a movable element arranged in cooperative relation with both said wet- and dry-air units and adapted to be deflected proportionally to the difference in response of said units, and means responsive to the dry-air temperature of the air being measured to cause the indication of the meter to vary as a function of the dry-air temperature.

The invention, both as to details of construction and combination of parts, will best be understood from the following description of a specific embodiment which I illustrate as an example, when read in conjunction with the accompanying drawings, in which:

Fig. 1 is a diagrammatic representation of a relative humidity responsive single thermocouple circuit powering the movable element of the meter of my invention.

Fig. 2 is a diagrammatic representation of a relative humidity responsive thermopile circuit powering the movable element of my meter.

Fig. 3 is a diagram showing the relation of relative humidity to the dry-air temperatures and the difference between the dry- and wet-air temperatures.

Fig. 4 is a diagrammatic view of my invention showing the meter with resilient scale.

Fig. 5 is a diagrammatic view of a modification of the resilient scale.

Fig. 6 is a front elevation of the self-contained direct-reading relative humidity meter of my invention.

Fig. 7 is a fragmentary front elevation of the device of Fig. 6.

Fig. 8 is a perspective view of the wet-air unit of the device of Fig. 6.

Fig. 9 is a fragmentary side elevation of a modification of the device of Fig. 6 in which the electric fan motor is replaced by a spring motor.

Fig. 10 is a fragmentary perspective view, partly in section, showing the movable element of my meter powered by opposed bimetal elements.

Fig. 11 is a fragmentary perspective, partly in section, of a modification of my meter having dry-air temperature responsive deflection sensitivity.

Fig. 12 is a fragmentary sectional view on the line 12—12 of Fig. 11.

Fig. 13 is a diagrammatic view of my meter with non-resilient proportionally variable scale.

Referring now to the drawings, Fig. 3 is a graph in which the unbroken lines are curves of constant relative humidity, ordinates are dry-air or ambient temperatures, and abscissae are depressions of wet-air temperature below dry-air temperature. These data are plotted from the standard psychrometric tables in the United States Weather Bureau publication W. B. No. 235.

Corresponding respectively to the unbroken curves of constant relative humidity, I have shown an equal plurality of broken straight lines 18 diverging from a common point 19 on the axis of ordinates at about eight degrees Fahrenheit, one of said straight lines being drawn to coincide generally with each of the constant relative humidity curves between the ordinates 40 F. and 100 F. As is readily evident from Fig. 3, per cent relative humidity can thus be represented with good fidelity by a series of straight lines on a graph of dry-air temperature against depression of wet-air temperature.

An indicating instrument having a deflecting element responsive to difference between wet-air and dry-air temperatures, when calibrated at constant dry-air temperature in accordance with the intersections of the relative humidity lines 18 with the ordinate representing the dry-air temperature, will indicate with good accuracy per cent relative humidity at that temperature. If the deflection of the element relative to the scale for a given wet-air to dry-air temperature differential be then made to vary inversely as the dry-air temperature less approximately 8 F., the instrument will indicate percentage relative humidity with good accuracy over the range of usual ambient temperatures as illustrated in Fig. 3. In other words, this effect is produced by merely making the sensitivity of indication of the meter inversely proportional to the dry-air temperature above approximately 8 F. I use the term "sensitivity of indication" to express the degree to which the deflection of the element relative to the scale is responsive to the difference between the wet-air and dry-air temperatures. As an illustration, referring to Fig. 3, the reading or indication for a dry-air temperature of 80 F. and a differential wet-air to dry-air temperature of 20 F. would be the same as for a dry-air temperature of 40 F. and a differential temperature of 9 F., namely 30% relative humidity. The instrument would thus have as great an indication relative to the scale for a 9 F. differential at 40 F. dry-air temperature as would result from a 20 F. differential at 80 F. dry-air temperature.

Figs. 1 and 2 illustrate thermoelectric circuits having instruments responsive to the difference between wet-air and dry-air temperatures. Fig. 1 shows a wet-air thermocouple unit 20 comprising a thermojunction 21 formed by union of two couple elements 22 and 23 secured with good thermal contact to a thermally conducting member 24, the whole being enclosed in an evaporative envelope 25. The thermocouple electric circuit is completed through a sensitive d'Arsonval-type ammeter 26, which forms the reference junction. When the air to be measured is forced past the wet-air unit 20 at the proper velocity with the wick 25 suitably moistened and with the ammeter 26 at the dry-air temperature, the net E. M. F. of the circuit, and therefore the current in the circuit, is substantially proportional to the depression of the wet-air temperature below the dry-air temperature.

Greater current for the same wet-air depression may be obtained with the wet-air unit of Fig. 2, and thus make possible the use of a much less sensitive and therefore cheaper ammeter. In place of the element 24 of Fig. 1, there are shown in Fig. 2, three elements 30, each the functional equivalent of element 24. The thermocouples 31 are arranged as a thermopile with intermediate junctions 32 at the same temperature as the reference junction at the ammeter 33. The elements 30 and attached thermocouples are electrically insulated from each other by shellac or other electric insulating coating which will not materially reduce the heat transfer from the elements 30 to the evaporative envelope 34.

One method of providing the desired variation of sensitivity of indication with change of ambient temperature is illustrated in Fig. 4 in which a d'Arsonval ammeter 35 is shown comprised of a permanent magnet 36, core 37, movable coil 38 and pointer 39. In place of the customary scale, however, there is provided a resilient scale 40 composed of a flat rubber band, or the like, graduated in per cent relative humidity with the spacings of the graduations proportional to the horizontal spacings of the broken relative humidity lines of Fig. 3. The left hand end 41 of the scale 40 is fixed relative to magnet 36, while the right hand end 42 is attached to the temperature responsive or movable end 43 of a bimetal element 44 whose other end 45 is also fixed relative to magnet 36. When the ammeter 35 is suitably connected to one of the wet-air units previously described, the pointer 39 will deflect proportionally to the depression of the wet-air temperature below ambient, or proportionally to the abscissae of the graph of Fig. 3. The element 44 is constructed so that the movement of its end 43, and therefore the stretch of the resilient scale 40, in response to changes in ambient temperature, is such that for any ambient temperature between 40 F. and 100 F., the scale 40 will be stretched to correspond with the broken lines of the graph of Fig. 3 at the particular ambient temperature ordinate. Because the broken lines 18 are straight and converge to a point this is a simple matter. The departure in Fig. 3, of the broken lines from the unbroken lines, between the ordinates 40 F. and 100 F., shows that the errors to be expected in reading this meter directly in relative humidity are of a very low order.

A pointer 46 is attached to the end 43 of bimetal element 44 and is arranged to traverse a scale 47 fixed with respect to magnet 36 and suitably graduated in degrees of temperature so that the device also functions as a thermometer.

In place of the flat band 40, I have shown in the relative humidity meter 50 of Fig. 5, an elastic scale 51 composed of a flattened helical spring 52. The major or cardinal divisions are provided with index tabs 53 extending beyond the spring 52 and being marked with the appropriate value of per cent relative humidity.

A stiff internal core 55, suitably secured in fixed relationship to the frame 56 of the meter, supports the spring 52 in the desired scale shape, in this case illustrated as a circular arc. The left hand end 57 of the scale 51 is secured to core 55. A bimetal element 44' has one end 45' fixed to the frame 56, with the other end 43' secured to the movable end 58 of the scale 51. The separations of the individual turns of spring 52 are preformed to correspond to aliquot subdivisions of per cent relative humidity in accordance with the separations of the broken lines of the graph of Fig. 3, taking into account the shape of scale 51. A pointer 59 attached to the end 58 of scale 51 registers with an ambient temperature scale 60 fixed to the core 55 so that the meter can also be used as a thermometer.

My invention, as embodied in a small self-contained compact portable relative humidity indicator, is illustrated in Figs. 6, 7 and 8. A base 65 has attached thereto a miniature centrifugal blower 66 driven by an electric motor 67 which is supplied with electricity via leads 68 and 69 from a suitable source of current supply (not illustrated) which may be A.-C. or D.-C. A collar bracket 70 is provided with an outward flange 71 which is attached by screws to the base 65. A container 72 having a cylindrical lower reservoir section 73, a duct section 74, and a mouth section 75, is held in place by the bracket 70 which fits about the reservoir 73. The duct 74 communicates with the reservoir 73 by way of an opening 76 rimmed by an annular shoulder 77, the mouth 75 being centered over the opening 76. A small wet-air thermocouple unit 78 which may be of the type shown in Figs. 1 or 2 or the equivalent thereof, but illustrated as of the thermopile type of Fig. 2, has its conductor elements 79 extending through a cork or rubber stopper 80 which fits snugly into the mouth 75 so that the body of the wet-air unit 78 is suspended centrally within the duct 74 and the dependent wick 81 of the unit 78 passes through the opening 76 into the reservoir 73. A conical collar 82 of waxed paper or other non-absorbent material, is fitted over the wick 81 so that said collar rests on the shoulder 77, thereby sealing reservoir 73 and minimizing the rate at which water is evaporated therefrom. The exhaust vent 83 of the fan 66 abuts the inlet end of the duct 74 and the joint is made airtight with an elastic sleeve 84 which fits over both parts. A d'Arsonval meter 85 constructed according to the modifications of my invention hereinbefore described or those disclosed in my aforesaid copending patent application Serial No. 229,281 as being adapted to read directly in per cent relative humidity when connected to a properly conditioned wet-air thermocouple unit, is also attached to the base 65, the terminal leads 86 and 87 of the wet-air unit 78 being connected thereto.

The operation of this meter is as follows. The reservoir 73 is filled with water 88 through the mouth 75 and opening 76. The assembly comprising stopper 80, wet-air unit 78, wick 81, and collar 82 is slipped into place through the mouth 75. Electric current is then supplied to the motor 67 causing the fan 66 to force a stream of air through the duct 74 over the unit 78. In a few seconds the temperature of the measuring junction of the unit 78 will be reduced to the wet-air temperature and the meter 85 will indicate per cent relative humidity in accordance with the broken lines of the graph of Fig. 3, as previously explained.

The illustrations of Figs. 6 and 7 depict the container 72 as made of glass but it may be made of any other suitable material such as metal or a resin. In place of the electric motor 67, a spring powered motor 90 with manual wind 91, on a base 65' illustrated in Fig. 9, may be used to drive the fan 66' which is shown with a screen or filter 92 to minimize accumulation of dirt in the duct or on the wet-air unit, although experience has shown that the wet-air unit will operate with good accuracy when quite dirty. The meter is designed for both continuous operation and for spot readings. In the latter case the fan is started and the indicating pointer of the meter is observed until it reaches a minimum value of relative humidity, the steady state condition being reached in a few seconds as a result of the small size of the wet-air unit. Either of the wet-air units illustrated in Figs. 1 or 2 may be used with this meter, a less sensitive ammeter being required if the wet-air thermopile of Fig. 2 is used.

In place of the thermocouple wet-air units of Figs. 1 and 2, the bimetal wet-air unit 100 of the meter shown in Fig. 10 may be used. In this device a bimetal spiral 101 has its internal end fixed to a concentric shaft 102 rotatably mounted in a ball thrust bearing 103. The external end of the spiral 101 is attached to a rigid arm 104 fixed to a cylindrical sleeve 105 integral with or secured to the stationary part of the bearing 103. The shaft 102 and the sleeve 105 are made of thermally non-conducting material such as synthetic resin or plastics. An evaporative envelope 106 completely encloses the spiral 101 and a part of the sleeve 105, in such manner that heat leakage into the interior of said envelope 106 via the sleeve 105 is insignificant. The wet-air unit 100 comprises the envelope 106 and the mechanism enclosed therein.

The shaft 102 extends beyond the bearing 103 and carries at the outer end a bimetal spiral 107 similar to the spiral 101 and similarly attached to the shaft 102. The external end of the spiral 107 is rigidly linked to the lower end of a pointer 108 by a connecting member 109 disposed parallel to shaft 102. The pointer 108 is carried on a shaft 110 aligned with shaft 102 and journaled in a bearing 111. The entire indicating mechanism is mounted so that the upper or indicating end 112 of pointer 108 traverses the expansible scale 40' which may be any of the scales shown in Figs. 4, 5, 13 or their equivalents.

When the wet-air unit 100 and the spiral 107 are exposed to a current of the air to be measured at the proper velocity, the spiral 101 will soon reach the wet-air temperature and the spiral 107 the dry-air temperature. The pointer 108 will be rotated by the member 109 to a position corresponding to the differential rotation of the spirals 101 and 107 which is proportional to the difference between the wet- and dry-air temperatures or the abscissae of the graph of Fig. 3. In effect this device is a mechanical functional equivalent of the thermocouple circuits of Figs. 1 and 2.

In Fig. 11 I have shown the wet-air unit 100' which is similar to the unit 100 except that the axis of rotation is vertical instead of horizontal and the spiral 101' is encased in a housing 115 of thin metal of good thermal conductivity such as copper or silver. The housing 115 prevents the envelope 106' from interfering with the movement of the spiral 101' and also protects the bimetal from corrosion by the moisture. The housing 115 is preferably filled with a light oil to minimize any lag in reaching steady state temperature. A crank 116 journaled in a fixed bearing 117 aligned with shaft 102' has its offset end attached to the external end of the dry-air spiral 107'. Another bearing 118 is translatably mounted in a guide 119 for constrained movement in alignment with shaft 102' as imposed by a U-shaped bimetal element 120 having its ends attached respectively to the bearings 117 and 118. A shaft 121 is journaled in bearing 118 which is of the thrust type to prevent axial movement of the shaft. The shaft 121 is provided with a slotted sleeve 122 at its lower end to receive the upper end of the crank shaft 116 which carries a transverse pin 123 engageable in the slot to prevent relative rotation of the two shafts while permitting relative axial movement. The upper end of shaft 121 is bent at right angles to form a lever 124 whose end engages a radial slot 125 in the upper end of a gear sector 126.

The sector 126 is fixed to a shaft 127 journaled in a fixed bearing 128, the shaft 127 being attached to the sector at a point between the slot 125 and the lower or gear end 129 so that the axis of rotation of the sector is relatively very close to the slot 125 as compared with the end 129. The gear 129 engages a pinion 130 fixed to a shaft 131 which extends through and is journaled in a bearing 132 and carries a pointer 133 operating over a fixed scale 134. A fine spiral spring 135 is attached to shaft 131 and bearing 132 to eliminate backlash.

This device functions as follows: The shaft 116 rotates proportionally to the difference between wet- and dry-air temperatures as previously explained for the device of Fig. 10. This rotation is communicated through shaft 121 to the sector 126, but the point of engagement of the lever 124 in the slot 125 is determined by the bimetal element 120. That is, the higher the ambient temperature, the higher the bearing 118 will ascend in its guide 119 and the less will be the rotation of the sector 126 and hence of the pointer 133. The object of the proportioning of the sector 126 to give a high mechanical advantage of the order of 10 to 1 or more is to provide a relatively great movement of the pointer 133 for a very small deflection of the lever 124 in the slot 125. Not only does this construction eliminate the need for excess clearances in the slot and lever connection as shown in Fig. 12, but the proportionality of angular movement is maintained at that connection because only very small angles are involved. In this device it is obvious that the shaft 116 could be operated from the rotating elements of the ammeters of the thermocouple circuits of Figs. 1 and 2 as well as from the mechanical differential unit illustrated.

The principle of the elastic scale in connection with my relative humidity meter is not intended to be limited to the use of an elastic medium. In place of the elastic or resilient scales of Figs. 4 and 5, the scale may be constructed in the manner of a folding fan or it may be constructed similarly to the iris of a camera, with the component elements representing major divisions of per cent relative humidity and arranged to be positioned in accordance with the graph of Fig. 3 for the various ambient temperatures by a suitable bimetal element or the equivalent. An example of such construction is illustrated in Fig. 13 in which arms 190 pivoted at a point 191 are positioned in accordance with the lines 18 of Fig. 3 to represent the cardinal percentages of a relative humidity scale as indicated by the index tabs 53'. The positioning is accomplished by the bimetal element 44'' which revolves a suitably guided circular-arc rack 192 about the point 191 as the ambient temperature changes. Proportional changes in spacing of the arms 190 are obtained by means of pinions 193 rotatably attached to the outer ends of the arms 190 so that they engage both the rack 192 and individual sectors of a fixed annular gear 194. The individual pinions 193 and sectors of gear 194 are severally proportioned to move the arms 190 to the desired positions for any particular ambient temperature.

For intermediate scale divisions, elements of wire or other suitable material may be attached to or be guided by the median intersections of lazy tongs connected between pairs of the arms 190. This construction is shown in Fig. 13 for scale subdivisions between 10% and 20% relative humidity, the elements 195 representing scale subdivisions being positioned by the two sets of lazy tongs 196 and 197. The space enclosed in the dashed lines is the portion of the scale intended to be exposed to view in the assembled meter. The indicating element for this device may be that of Figs. 1, 2, 10 or their equivalents.

It should be realized that the foregoing thermoelectric powered meters are suitable for remote indication of relative humidity. It is well-known that in place of the dry-air responsive thermosensitive elements, generally shown herein as bimetal devices, remotely actuated thermosensitive devices, such as that illustrated in Fig. 6 of the aforesaid Patent No. 2,293,064 or its functional equivalent may be used. Such construction permits the meter in its various forms to be used for air in ducts or other inaccessible places and the location of the meter itself to suit the convenience of the user.

Although the compact self-contained device of Figs. 6 and 7 is shown with a thermoelectric powered differential unit, it is obvious that the bimetal powered differential units of Figs. 10 and 11 may be used instead with either the expansible scale or the variable deflection sensitivity control.

Although the invention has been described in considerable detail, such description is intended as illustrative rather than limiting, as numerous embodiments will be apparent to those skilled in the art. My invention, therefore, is not to be limited except insofar as is necessitated by the prior art or by the spirit of the appended claims.

I claim:

1. In a direct reading relative humidity meter, a deflecting element responsive to the difference between the wet-air and dry-air temperatures of the air to be measured, a scale adapted to be varied in length, a pointer adjacent to said scale and constructed and arranged to be deflected over said scale proportionally to the deflection of said element, and means to vary the length of the scale such that the sensitivity of indication of said pointer relative to said scale is in inverse proportion to the dry-air temperature in degrees F. less approximately 8 F.

2. In a direct reading relative humidity meter, a differential unit including a pointer responsive to the difference between the wet-air and the dry-air temperatures of the air to be measured, a scale adjacent to the path of said pointer, said scale being adapted to be varied in length and the divisions of said scale to be proportionally elongated or contracted as the scale is lengthened or shortened, and means to vary the length of said scale as a function of temperature.

3. In an indicating instrument, a frame, a scale, a deflection element mounted on said frame and having a pointer adjacent said scale and movable with respect thereto, said scale having one end fixed to said frame and being adapted to be varied in length, and means for varying the length of said scale, said means being mounted on said frame independently of said element.

4. In an indicating instrument, a frame, a scale, a deflection element mounted on said frame and having a pointer adjacent said scale and movable with respect thereto, said scale having one end fixed to said frame and being adapted to be elastically stretched, and means for stretching said scale, said means being mounted on said frame independently of said element.

5. In a hygrometer, a wet-air unit comprising an evaporative envelope adapted to be subjected to standard evaporating conditions, a bimetal spiral enclosed within said envelope, a sleeve member piercing said envelope and having a cylindrical opening, a shaft rotatably disposed in the opening in said member, said shaft being fixed to the inner end of said spiral and said member being fixed relative to the outer end of said spiral.

6. The invention set forth in claim 5 characterized in that said member and said shaft are composed of thermally non-conducting material, and said spiral being proportioned to the evaporative properties of the envelope such that said spiral is cooled substantially to the temperature of the surface of the envelope.

7. The invention set forth in claim 5 characterized in that said spiral is enclosed within a housing of thin metal of good thermal conductivity.

8. In a relative humidity meter, a differential wet- and dry-air unit comprising an evaporative envelope adapted to be subjected to standard evaporating conditions, a first bimetal spiral enclosed within said envelope, a fixed cylindrical sleeve member piercing said envelope, a shaft disposed coaxially within said member, a second bimetal spiral disposed externally to said envelope, the inner end of each of said spirals being respectively fixed to each end of said shaft and coaxial therewith and the outer end of said first spiral being fixed relative to said member, and means to support said shaft rotatably within said member whereby the outer end of said second spiral is deflected in response to the difference between the wet- and dry-air temperatures of the air being measured.

9. In a direct reading relative humidity meter, the combination of a thermocouple circuit comprising (1) a wet-air thermocouple unit adapted to be exposed under standard evaporating conditions to the air to be measured, (2) a reference thermojunction in said air, and (3) an electric instrument having an indicating element responsive to the current in said circuit, said instrument including a scale adapted to be varied in length, and means for varying the length of said scale as a function of temperature.

10. The invention set forth in claim 9 characterized in that the divisions of said scale are adapted to be proportionally elongated and contracted as the scale is lengthened and shortened.

11. The invention set forth in claim 9 characterized in that said scale is elastic and that said means is adapted to stretch said scale.

12. The invention set forth in claim 2 characterized in that said meter includes means for directing a current of the air to be measured against the wet-air component of said differential unit, and reservoir means for supplying moisture to said wet-air component.

FRANK KAHN.